United States Patent
Bys et al.

(10) Patent No.: US 10,897,411 B1
(45) Date of Patent: Jan. 19, 2021

(54) PASSIVE PACKET CROSS CHECK FOR MULTI-NODE SYSTEMS

(71) Applicant: Rockwell Collins, Inc., Cedar Rapids, IA (US)

(72) Inventors: Andrew J. Bys, Cedar Rapids, IA (US); TJ T. Kwon, Marion, IA (US); Wayne H. Meyer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/376,270

(22) Filed: Apr. 5, 2019

(51) Int. Cl.
| | |
|---|---|
| *H04L 29/06* | (2006.01) |
| *H04L 12/26* | (2006.01) |
| *H04W 24/08* | (2009.01) |
| *H04L 29/08* | (2006.01) |
| *H04W 84/18* | (2009.01) |

(52) U.S. Cl.
CPC .......... *H04L 43/04* (2013.01); *H04L 67/2842* (2013.01); *H04W 24/08* (2013.01); *H04W 84/18* (2013.01)

(58) Field of Classification Search
CPC ............. H04L 63/1425; H04L 63/1458; H04L 63/1441; H04L 63/1408; H04L 63/1416; H04L 2463/141; H04L 12/1854; H04L 45/32; H04L 45/36; H04L 12/185
See application file for complete search history.

(56) References Cited

U.S. PATENT DOCUMENTS

| | | | | |
|---|---|---|---|---|
| 5,007,052 | A * | 4/1991 | Flammer | H04L 12/1854 370/389 |
| 2004/0257999 | A1* | 12/2004 | MacIsaac | H04L 69/163 370/252 |
| 2009/0037592 | A1* | 2/2009 | Lyon | H04L 29/06027 709/228 |
| 2010/0122342 | A1* | 5/2010 | El-Moussa | H04L 63/1458 726/22 |
| 2011/0239301 | A1* | 9/2011 | Jakubik | H04L 63/1458 726/23 |
| 2015/0007314 | A1* | 1/2015 | Vaughan | H04L 63/1425 726/23 |
| 2016/0294865 | A1* | 10/2016 | Wei | H04L 41/28 |

* cited by examiner

*Primary Examiner* — Jung Liu
(74) *Attorney, Agent, or Firm* — Suiter Swantz pc llo

(57) ABSTRACT

A method of performing passive packet cross-checking of flooding packets within a multi-node system is disclosed. A first flooding packet is transmitted from a communication node to a first additional communication node of the multi-node system. The first flooding packet causes the first additional communication node to transmit a second flooding packet based on the first flooding packet to the communication node and to a second additional communication node of the multi-node system. A copy of the first flooding packet is stored in a memory cache of the communication node. The second flooding packet is received at the communication node from the first additional communication node. The second flooding packet and the stored copy of the first flooding packet are compared at the communication node, and a status of the first additional communication node is determined based on the comparison.

5 Claims, 7 Drawing Sheets

PASSIVE PACKET CROSS CHECK FOR MULTI-NODE SYSTEMS

BACKGROUND

In a multi-node system, such as a mobile ad hoc network (MANET), there is no guarantee of correct error recoveries and detections. For example, error detection may return true negatives and may trigger incorrect packet propagations. Currently, there is no mechanism to cross-check flooding packets. This leaves systems vulnerable to erroneous or malicious activity. For instance, a malicious node may inject an incorrect flooding packet, or in other instances, a benign node may recover a flooding packet incorrectly and initiate another flooding (with the incorrect data). The propagation of incorrect data throughout the system may occupy bandwidth and result in degraded performance even if the other nodes are functioning correctly.

SUMMARY

A communication node for performing passive packet cross-checking of flooding packets within a multi-node system is disclosed. In one or more embodiments, the communication node includes a communication interface and a controller communicatively coupled to the communication interface. The controller is configured to transmit a first flooding packet to a first additional communication node of the multi-node system. The first flooding packet causes the first additional communication node to transmit a second flooding packet based on the first flooding packet to the communication node and to a second additional communication node of the multi-node system. The controller is further configured to store a copy of the first flooding packet in a memory cache. The controller is further configured to receive the second flooding packet from the first additional communication node. The controller is further configured to compare the second flooding packet and the stored copy of the first flooding packet to determine a status of the first additional communication node based on the comparison.

In some embodiments of the communication node, the controller is configured to compare the second flooding packet and the stored copy of the first flooding packet by comparing a data payload of the second flooding packet to a data payload of the stored copy of the first flooding packet.

In some embodiments of the communication node, the controller is further configured to determine the status of the first additional communication node by detecting erroneous operation of the first additional communication node when the data payload of the second flooding packet differs from the data payload of the stored copy of the first flooding packet.

In some embodiments of the communication node, the controller is further configured to determine the status of the first additional communication node by detecting non-erroneous operation of the first additional communication node when the data payload of the second flooding packet matches the data payload of the stored copy of the first flooding packet.

In some embodiments of the communication node, the controller is further configured to determine that the data payload of the second flooding packet matches the data payload of the stored copy of the first flooding packet when the data payload of the second flooding packet and the data payload of the stored copy of the first flooding packet have no more than a predetermined maximum number of mismatched bit values.

In some embodiments of the communication node, the controller is further configured to determine that the data payload of the second flooding packet differs from the data payload of the stored copy of the first flooding packet when the data payload of the second flooding packet and the data payload of the stored copy of the first flooding packet have more than a predetermined maximum number of mismatched bit values.

In some embodiments of the communication node, the multi-node system is a mobile ad hoc network (MANET), and the communication node is a mobile communication node.

A multi-node system for performing passive packet cross-checking of flooding packets is also disclosed. In one or more embodiments, the multi-node system includes a plurality of communication nodes configured to receive data packets broadcasted from other communication nodes within the multi-node system. In one or more embodiments, a communication node of the plurality of communication nodes includes a communication interface and a controller communicatively coupled to the communication interface. The controller is configured to transmit a first flooding packet to a first additional communication node of the multi-node system. The first flooding packet causes the first additional communication node to transmit a second flooding packet based on the first flooding packet to the communication node and to a second additional communication node of the multi-node system. The controller is further configured to store a copy of the first flooding packet in a memory cache. The controller is further configured to receive the second flooding packet from the first additional communication node. The controller is further configured to compare the second flooding packet and the stored copy of the first flooding packet to determine a status of the first additional communication node based on the comparison.

In some embodiments of the multi-node system, the controller is configured to compare the second flooding packet and the stored copy of the first flooding packet by comparing a data payload of the second flooding packet to a data payload of the stored copy of the first flooding packet.

In some embodiments of the multi-node system, the controller is further configured to determine the status of the first additional communication node by detecting erroneous operation of the first additional communication node when the data payload of the second flooding packet differs from the data payload of the stored copy of the first flooding packet.

In some embodiments of the multi-node system, the controller is further configured to determine the status of the first additional communication node by detecting non-erroneous operation of the first additional communication node when the data payload of the second flooding packet matches the data payload of the stored copy of the first flooding packet.

In some embodiments of the multi-node system, the controller is further configured to determine that the data payload of the second flooding packet matches the data payload of the stored copy of the first flooding packet when the data payload of the second flooding packet and the data payload of the stored copy of the first flooding packet have no more than a predetermined maximum number of mismatched bit values.

In some embodiments of the multi-node system, the controller is further configured to determine that the data payload of the second flooding packet differs from the data payload of the stored copy of the first flooding packet when the data payload of the second flooding packet and the data payload of the stored copy of the first flooding packet have more than a predetermined maximum number of mismatched bit values.

In some embodiments of the multi-node system, the multi-node system is a mobile ad hoc network (MANET), and the communication node is a mobile communication node.

A method of performing passive packet cross-checking of flooding packets within a multi-node system is also disclosed. In one or more embodiments, the method includes the following steps. A first flooding packet is transmitted from a communication node to a first additional communication node of the multi-node system. The first flooding packet causes the first additional communication node to transmit a second flooding packet based on the first flooding packet to the communication node and to a second additional communication node of the multi-node system. A copy of the first flooding packet is stored in a memory cache of the communication node. The second flooding packet is received at the communication node from the first additional communication node. The second flooding packet and the stored copy of the first flooding packet are compared at the communication node, and a status of the first additional communication node is determined based on the comparison.

In some embodiments of the method, a data payload of the second flooding packet is compared to a data payload of the stored copy of the first flooding packet.

In some embodiments of the method, the status of the first additional communication node is determined by detecting erroneous operation of the first additional communication node when the data payload of the second flooding packet differs from the data payload of the stored copy of the first flooding packet.

In some embodiments of the method, the status of the first additional communication node is determined by detecting non-erroneous operation of the first additional communication node when the data payload of the second flooding packet matches the data payload of the stored copy of the first flooding packet.

In some embodiments of the method, it is determined that the data payload of the second flooding packet matches the data payload of the stored copy of the first flooding packet when the data payload of the second flooding packet and the data payload of the stored copy of the first flooding packet have no more than a predetermined maximum number of mismatched bit values.

In some embodiments of the method, it is determined that the data payload of the second flooding packet differs from the data payload of the stored copy of the first flooding packet when the data payload of the second flooding packet and the data payload of the stored copy of the first flooding packet have more than a predetermined maximum number of mismatched bit values.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
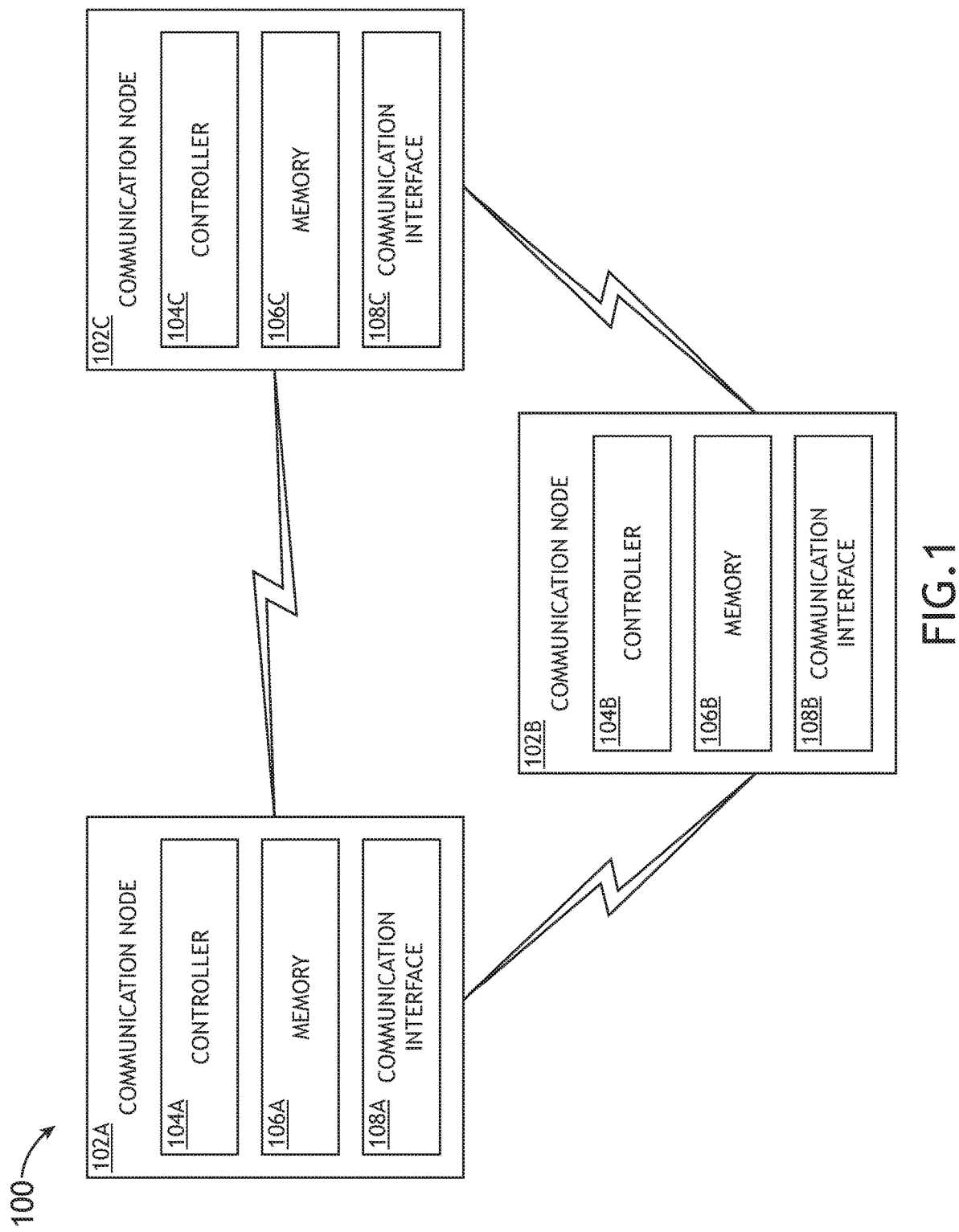
FIG. 1 is a block diagram illustrating a multi-node system that employs passive packet cross-checking of flooding packets, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Techniques for performing passive packet cross-checking of flooding packets within a multi-node system are disclosed. In a multi-node system, such as a mobile ad hoc network (MANET), there is no guarantee of correct error recoveries and detections. For example, error detection may return true negatives and may trigger incorrect packet propagations. Currently, there is no mechanism to cross-check flooding packets. This leaves systems vulnerable to erroneous or malicious activity. For instance, a malicious node may inject an incorrect flooding packet, or in other instances, a benign node may recover a flooding packet incorrectly and initiate another flooding (with the incorrect data). The propagation of incorrect data throughout the system may occupy bandwidth and result in degraded performance even if the other nodes are functioning correctly. The disclosed passive packet cross-checking techniques enable detection of erroneous flooding packets transmitted by downstream nodes. Consequently, it may be possible to detect malfunctioning or malicious nodes so that appropriate steps can be taken to prevent propagation of erroneous flooding packets throughout the system. This can help prevent degraded system performance resulting from bandwidth being occupied by continued transmissions of incorrect/erroneous data by downstream nodes in the system.

FIG. 1 illustrates a multi-node system 100, in accordance with an example embodiment of the present disclosure. In embodiments, the multi-node system 100 may include a plurality of communication nodes 102. For example, the multi-node system 100 may include a first communication node 102A, a second communication node 102B, a third communication node 102C, and so on.

The multi-node system 100 may comprise any multi-node communication network known in the art. For example, in some embodiments, the multi-node system 100 may be a mobile ad-hoc network (MANET) in which one or more of the communication nodes 102 within the multi-node system 100 are mobile communication nodes that are able to move freely and independently. Similarly, the one or more communication nodes 102 may include any communication node known in the art which may be communicatively coupled. In this regard, the one or more communication nodes 102 may include any communication node known in the art for transmitting and receiving data packets. For example, the one or more communication nodes 102 may include, but are not limited to, radios, mobile phones, smart phones, tablets, smart watches, laptops, computer systems, or any combination thereof.

In embodiments, each communication node 102 (e.g., communication node 102A, 102B, 102C, etc.) includes a respective controller 104 (e.g., controller 104A, 104B, 104C, etc.), memory 106 (e.g., memory 106A, 106B, 106C, etc.), and communication interface 108 (e.g., communication interface 108A, 108B, 108C, etc.).

The controller 104 provides processing functionality for at least the communication node 102 and can include any number of processors, micro-controllers, circuitry, field programmable gate array (FPGA) or other processing systems, and resident or external memory for storing data, executable code, and other information accessed or generated by the communication node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communication node 102/ controller 104, such as software programs and/or code segments, or other data to instruct the controller 104, and possibly other components of the communication node 102, to perform the functionality described herein. Thus, the memory 106 can store data, such as a program of instructions for operating the communication node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of the communication node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communication node 102 and the controller 104. It should be noted that while the communication interface 108 is described as a component of the communication node 102, one or more components of the communication interface 108 can be implemented as external components communicatively coupled to the communication node 102 via a wired and/or wireless connection. The communication node 102 can also include and/or connect to one or more input/output (I/O) devices.

In embodiments, the communication interface 108 includes or is coupled to a transmitter, receiver, transceiver, physical connection interface, or any combination thereof. In some embodiments, the communication interface 108 of a communication node 102 may be configured to communicatively couple to additional communication interfaces 108 of additional communication nodes 102 of the multi-node system 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

Figure 2:
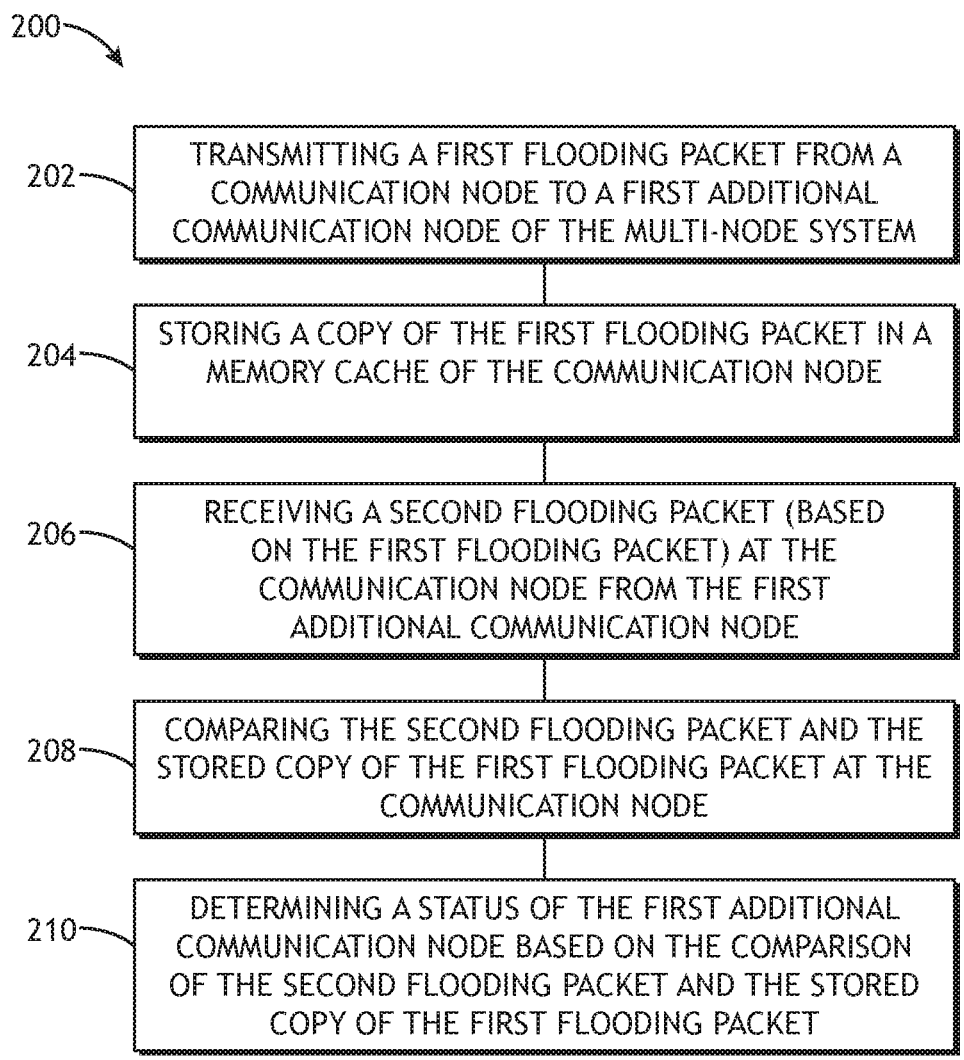
FIG. 2 is a flow diagram illustrating a method of performing passive packet cross-checking of flooding packets within a multi-node system, such as the multi-node system illustrated in FIG. 1, in accordance with one or more embodiments of this disclosure.

FIG. 2 illustrates a method 200 of performing passive packet cross-checking of flooding packets within a multi-node system. The method 200 may be carried out by the multi-node system 100. In this regard, the multi-node system 100 may include any component/configuration required to carry out a step/function of the method 200; similarly, the method 200 may include any step/function that corresponds to a component/configuration of the multi-node system 100. For example, the controller 104 of a communication node 102 may be configured to carry out various steps and functions of the method 200 illustrated in FIG. 2.

Figure 3A:
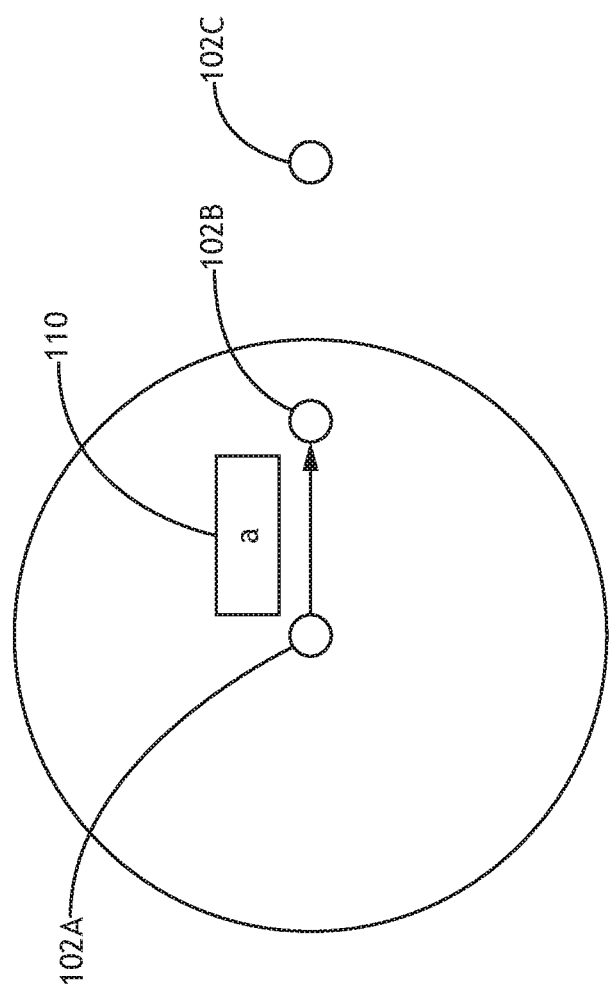
FIG. 3A schematically illustrates transmission of a first flooding packet from a communication node of the multi-node system to a first additional communication node of the multi-node system, in accordance with one or more embodiments of this disclosure.

At step 202, a first flooding packet is transmitted from a communication node 102 (e.g., communication node 102A) to a first additional communication node 102 (e.g., communication node 102B) of the multi-node system 100. In embodiments, the controller 104 of a communication node 102 is configured to transmit the flooding packet from the communication node 102 to an additional (e.g., downstream) communication node 102. For example, as shown in FIG. 3A, communication node 102A/controller 104A may be configured to send a flooding packet 110 (downstream) to communication node 102B.

Figure 3B:
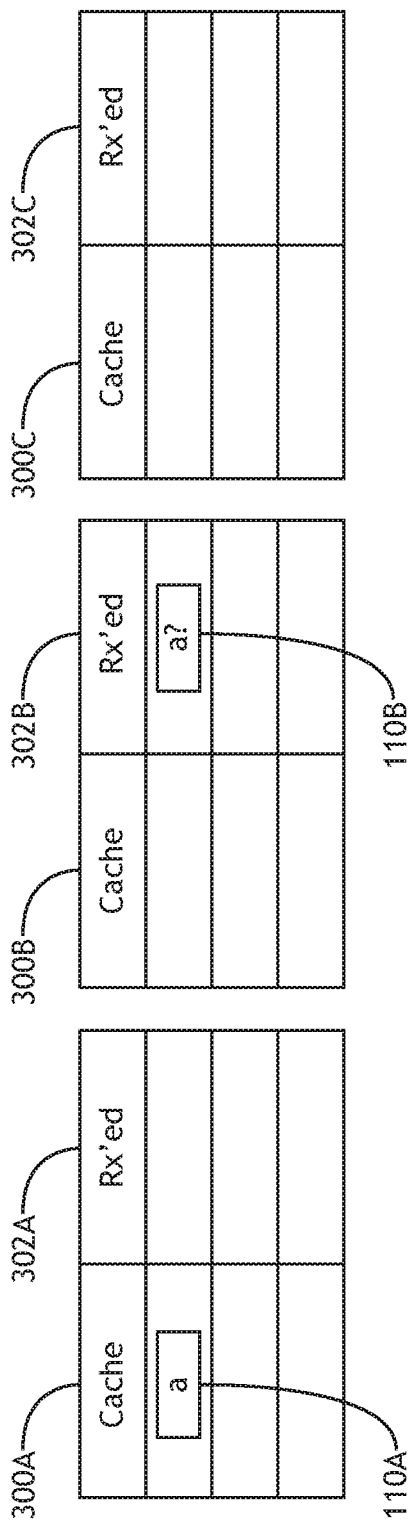
FIG. 3B schematically illustrates a copy of the first flooding packet stored in a cache memory of the communication node and another copy of the first flooding packet received at the first additional communication node, in accordance with one or more embodiments of this disclosure.

At step 204, a copy of the first flooding packet 110 is stored in a memory cache of the communication node 102 (e.g., communication node 102A). In embodiments, the controller 104 of a communication node 102 is configured to store a copy of the first flooding packet 110 in the memory cache of the communication node 102. For example, as shown in FIG. 3B, communication node 102A/controller 104A may be configured to store a copy 110A of flooding packet 110 in a cache memory 300A of the communication node 102A/controller 104A. In some embodiments, each of the communication nodes 102 may have a respective memory cache 300 stored in memory 106 that is integrated with or communicatively coupled to the controller 104.

The transmission of the first flooding packet 110 from communication node 102A, results in a copy 110B of the first flooding packet 110 being received at communication node 102B (sometimes referred to herein as the first additional communication node). For example, as shown in FIG. 3B, communication node 102B/controller 104B may be configured to receive a copy 110B of flooding packet 110 in a buffer 302B of the communication node 102B/controller 104B. In some embodiments, each of the communication nodes 102 may have a respective buffer 302 for processing received data packets.

Figure 3C:
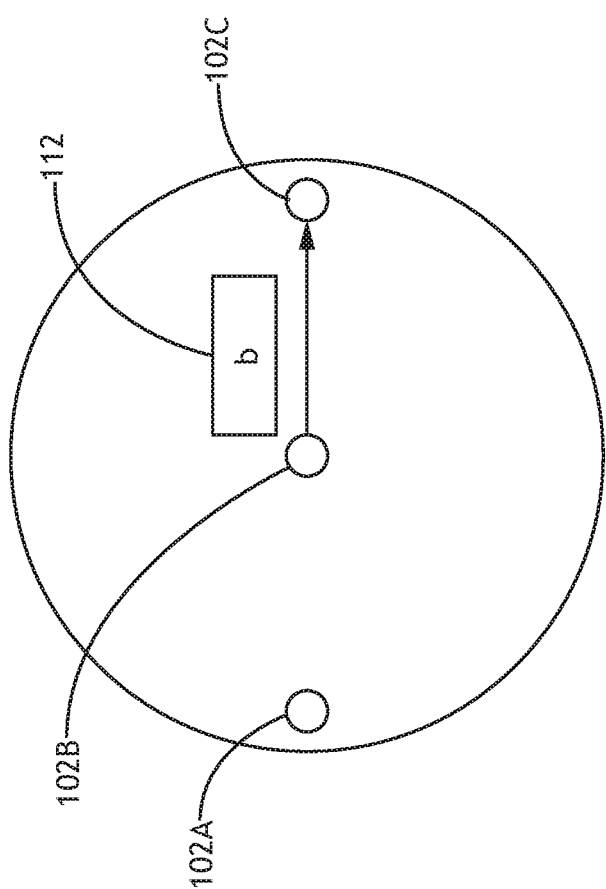
FIG. 3C schematically illustrates transmission of a second flooding packet (based on the first flooding packet) from the first additional communication node to a second additional communication node of the multi-node system, in accordance with one or more embodiments of this disclosure.

Referring now to FIG. 3C, the first flooding packet 110 causes the first additional communication node (e.g., communication node 102B) to transmit a second flooding packet 112 based on the first flooding packet 110 (upstream) to the communication node 102A and (downstream) to a second additional communication node (e.g., communication node 102C) of the multi-node system 100. For example, communication node 102B/controller 104B may be configured to generate and transmit the second flooding packet 112 based on reading, decrypting, and/or recovering the first flooding packet 110 (i.e., based on the copy 110B of the first flooding packet 110 received at communication node 102B). In this regard, the second flooding packet 112 should have the same data payload as the first flooding packet 110.

Figure 3D:
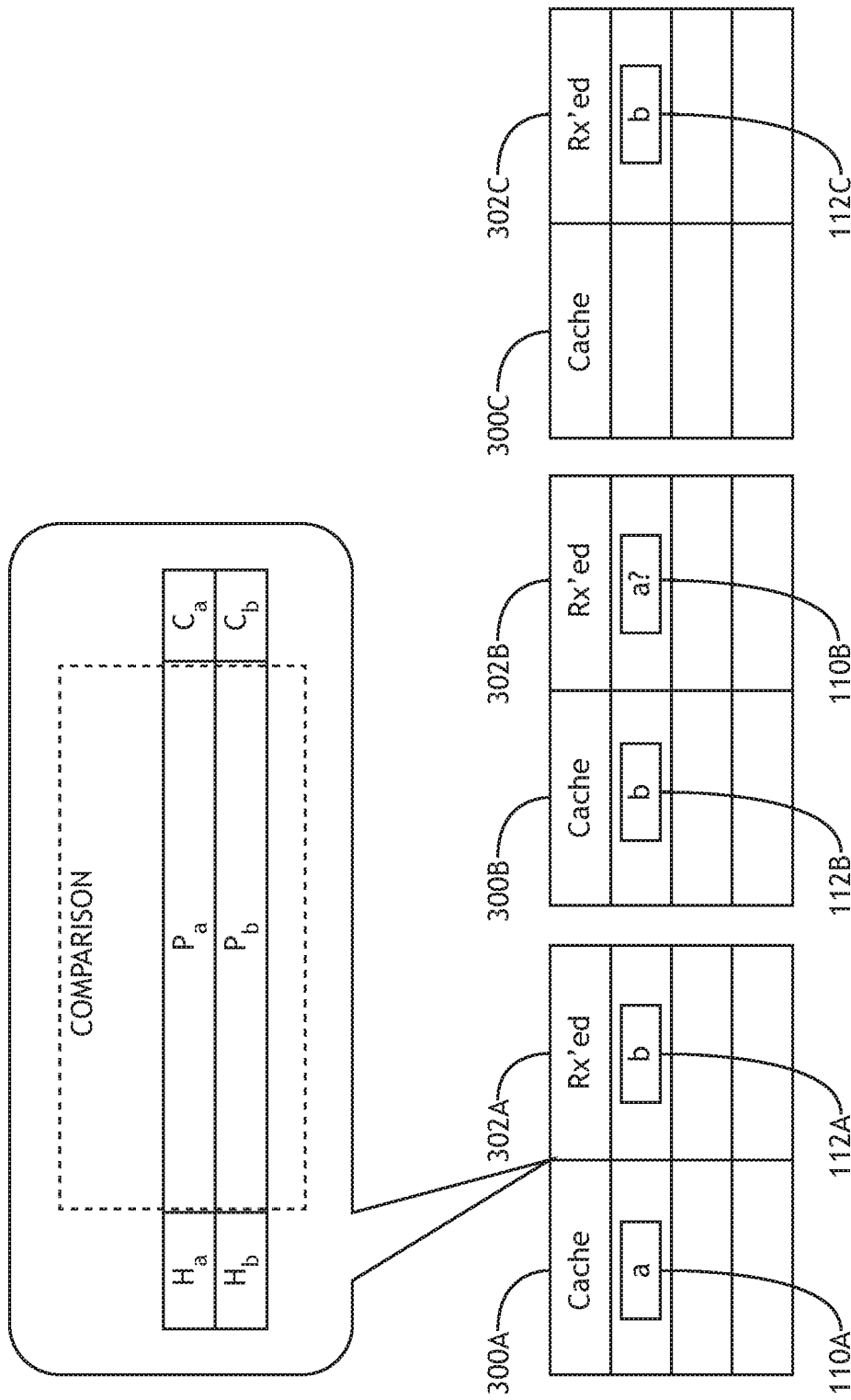
FIG. 3D schematically illustrates a copy of the second flooding packet received at the communication node, another copy of the second flooding packet stored in a cache memory of the first additional communication node, and another copy of the second flooding packet received at the first additional communication node, in accordance with one or more embodiments of this disclosure.

At step 206, the second flooding packet 112 is received at the communication node (e.g., communication node 102A) from the first additional communication node (e.g., communication node 102B). The second flooding packet 112 is also received at the second additional communication node (e.g., communication node 102C). For example, as shown in FIG. 3D, communication node 102A/controller 104A may be configured to receive a copy 112A of flooding packet 112 in a buffer 302A of the communication node 102A/controller 104A. Similarly, communication node 102C/controller 104C may be configured to receive a copy 112C of flooding packet 112 in a buffer 302C of the communication node 102C/controller 104C.

In embodiments, a copy 112B of the second flooding packet 112 is also stored in a memory cache 300B of communication node 102B. For example, communication node 102B/controller 104B may be configured to store a copy 112B of flooding packet 112 in the memory cache 300B of the communication node 102B/controller 104B so that the communication node 102B/controller 104B can perform method 200 to assess the status of downstream nodes 102 (e.g., communication node 102C, and so on). Any communication node 102 may be similarly configured to assess one or more downstream nodes with which it communicates and/or downstream retransmissions of flooding packets originating from the communication node 102.

Figure 3E:
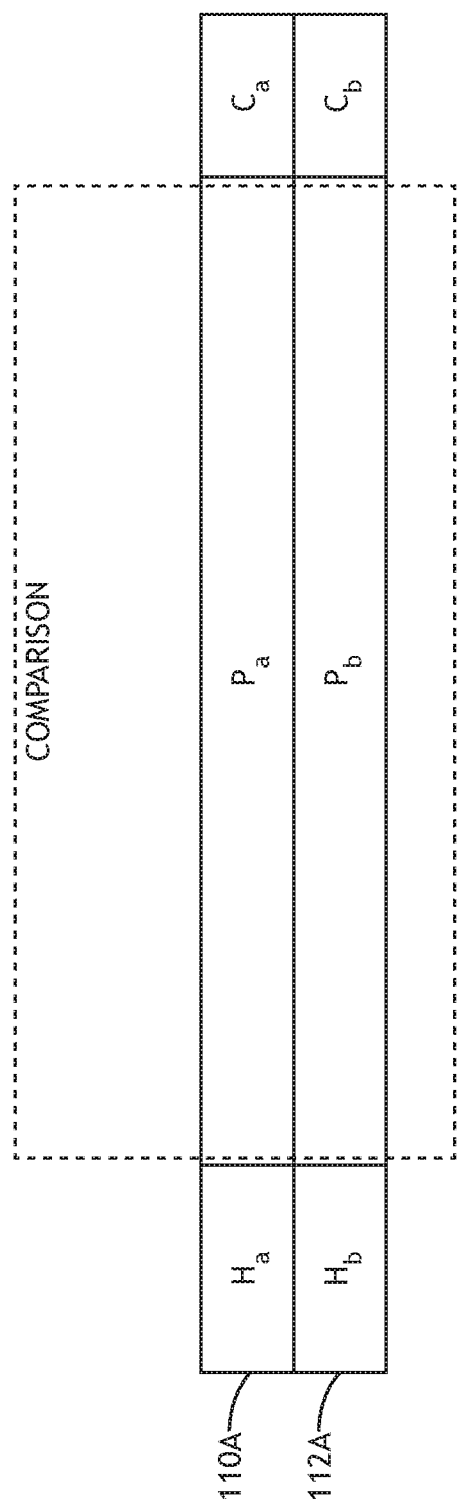
FIG. 3E schematically illustrates a comparison between the copy of the second flooding packet received at the communication node and the copy of the first flooding packet stored in the cache memory of the communication node, in accordance with one or more embodiments of this disclosure.

At step 208, the second flooding packet 112 (i.e., copy 112A of the second flooding packet 112) and the stored copy 110A of the first flooding packet 110 are compared at the communication node (e.g., communication node 102A) to assess the status of the second flooding packet 112 and/or the first additional communication node (e.g., communication node 102B). In embodiments, the controller 104 of a communication node 102 is configured to compare the second flooding packet 112 (i.e., copy 112A of the second flooding packet 112) and the stored copy 110A of the first flooding packet 110. For example, as shown in FIG. 3E, communication node 102A/controller 104A may be configured to compare the copy 112A of the second flooding packet 112 and the stored copy 110A of the first flooding packet 110. In some embodiments, a data payload $P_b$ of the second flooding packet 112 (i.e., copy 112A of the second flooding packet 112) is compared to a data payload $P_a$ of the stored copy 110A of the first flooding packet 110. For example, the controller 104 may be configured to perform a bitwise comparison between the data payload $P_b$ of the second flooding packet 112 (i.e., copy 112A of the second flooding packet 112) and the data payload $P_a$ of the stored copy 110A of the first flooding packet 110.

The controller 104A may be configured to determine that the data payload $P_b$ of the second flooding packet 112 (i.e., copy 112A of the second flooding packet 112) matches the data payload $P_a$ of the stored copy 110A of the first flooding packet 110 when data payload $P_b$ and data payload $P_a$ have no more (e.g., less than or equal to) a predetermined maximum number of mismatched bit values. Conversely, the controller 104A may be configured to determine that the data payload $P_b$ of the second flooding packet 112 (i.e., copy 112A of the second flooding packet 112) differs from the data payload $P_a$ of the stored copy 110A of the first flooding packet 110 when data payload $P_b$ and data payload $P_a$ have more (e.g., greater than) a predetermined maximum number of mismatched bit values. In some embodiments, the predetermined maximum number of mismatched bit values is zero (0), such that the controller 104A only detects a matching condition between the data payload $P_b$ of the second flooding packet 112 (i.e., copy 112A of the second flooding packet 112) matches the data payload $P_a$ of the stored copy 110A of the first flooding packet 110 when the two are identical. In other embodiments, the predetermined maximum number of mismatched bit values may be another value (e.g., 5, 10, 100, or any number selected or calculated based on system requirements), such that the controller 104A is configured to detect a matching condition between the data payload $P_b$ of the second flooding packet 112 (i.e., copy 112A of the second flooding packet 112) matches the data payload $P_a$ of the stored copy 110A of the first flooding packet 110 when the second flooding packet 112 (i.e., copy 112A of the second flooding packet 112) may be recoverable based on the stored copy 110A of the first flooding packet 110, for example, using data frame error recovery techniques described in U.S. patent application Ser. No. 16/367,483, which is incorporated herein by reference in its entirety.

At step 210, a status of the first additional communication node (e.g., communication node 102B) is determined based on the comparison of the second flooding packet 112 (i.e., copy 112A of the second flooding packet 112) and the stored copy 110A of the first flooding packet 110. For example, the controller 104A may be configured to determine the status of the first additional communication node (e.g., communication node 102B) based on the comparison of the second flooding packet 112 (i.e., copy 112A of the second flooding packet 112) and the stored copy 110A of the first flooding packet 110. In some embodiments, communication node 102A/controller 104A may be configured to detect erroneous operation (e.g., malfunctioning or malicious operation) of communication node 102B and/or erroneous retransmission of flooding packet 110 from communication node 102B when the data payload $P_b$ of the second flooding packet 112 (i.e., copy 112A of the second flooding packet 112) differs from the data payload $P_a$ of the stored copy 110A of the first flooding packet 110. Conversely, communication node 102A/controller 104A may be configured to detect non-erroneous operation (e.g., correct or proper functioning) of communication node 102B when the data payload $P_b$ of the second flooding packet 112 (i.e., copy 112A of the second flooding packet 112) matches the data payload $P_a$ of the stored copy 110A of the first flooding packet 110.

In some embodiments, when a non-erroneous operational status is detected, the controller 104A may be configured to remove (e.g., delete) the stored copy 110A of the first flooding packet 110 from the cache memory 300A because it may no longer be needed for error recovery and/or assessment of downstream nodes. In other embodiments, the stored copy 110A of the first flooding packet 110 may be removed from the cache memory 300A when the cache memory 300A is full and/or after a predetermined amount of time has lapsed from the time that the copy 110A of the first flooding packet 110 was stored in the cache memory 300A.

As previously noted herein, any communication node 102 (e.g., communication node 102B, 102C, etc.) may be similarly configured to assess one or more downstream nodes with which it communicates and/or downstream retransmissions of flooding packets originating from the communication node 102. For example, communication node 102B can be configured to perform the same steps or functions as communication node 102A with respect to communication node 102C in order to assess an operational status of communication node 102C and/or to assess retransmissions of flooding packets by communication node 102C. The multi-node system 100 may include any number of communication nodes 102 that are similarly configured to perform the steps or functions described herein with regard to communication node 102A and method 200.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A communication node for performing passive packet cross-checking of flooding packets within a multi-node system, comprising:
   a communication interface; and
   a controller communicatively coupled to the communication interface, the controller configured to:
      transmit a first flooding packet to a first additional communication node of the multi-node system, whereby the first flooding packet causes the first additional communication node to transmit a second flooding packet based on the first flooding packet to the communication node and to a second additional communication node of the multi-node system;
      store a copy of the first flooding packet in a memory cache;
      receive the second flooding packet from the first additional communication node;
      compare the second flooding packet and the stored copy of the first flooding packet by comparing a data payload of the second flooding packet to a data payload of the stored copy of the first flooding packet; and
      determine a status of the first additional communication node based on the comparison of the second flooding packet and the stored copy of the first flooding packet by detecting at least one of: erroneous operation of the first additional communication node when the data payload of the second flooding packet differs from the data payload of the stored copy of the first flooding packet; non-erroneous operation of the first additional communication node when the data payload of the second flooding packet matches the data payload of the stored copy of the first flooding packet; a match between the data payload of the second flooding packet and the stored copy of the first flooding packet when the data payload of the second flooding packet and the data payload of the stored copy of the first flooding packet have no more than a predetermined maximum number of mismatched bit values; or a difference between the second flooding packet and the first flooding packet when the data payload of the second flooding packet and the data payload of the stored copy of the first flooding packet have more than a predetermined maximum number of mismatched bit values.

2. The communication node of claim 1, wherein the multi-node system is a mobile ad hoc network (MANET), and the communication node is a mobile communication node.

3. A multi-node system for performing passive packet cross-checking of flooding packets within a multi-node system, comprising:

a plurality of communication nodes configured to receive data packets broadcasted from other communication nodes within the multi-node system, wherein a communication node of the plurality of communication nodes includes:

a communication interface; and a controller communicatively coupled to the communication interface, the controller configured to:

transmit a first flooding packet to a first additional communication node of the multi-node system, whereby the first flooding packet causes the first additional communication node to transmit a second flooding packet based on the first flooding packet to the communication node and to a second additional communication node of the multi-node system;

store a copy of the first flooding packet in a memory cache;

receive the second flooding packet from the first additional communication node;

compare the second flooding packet and the stored copy of the first flooding packet by comparing a data payload of the second flooding packet to a data payload of the stored copy of the first flooding packet; and determine a status of the first additional communication node based on the comparison of the second flooding packet and the stored copy of the first flooding packet by detecting at least one of: erroneous operation of the first additional communication node when the data payload of the second flooding packet differs from the data payload of the stored copy of the first flooding packet; non-erroneous operation of the first additional communication node when the data payload of the second flooding packet matches the data payload of the stored copy of the first flooding packet; a match between the data payload of the second flooding packet and the stored copy of the first flooding packet when the data payload of the second flooding packet and the data payload of the stored copy of the first flooding packet have no more than a predetermined maximum number of mismatched bit values; or a difference between the second flooding packet and the first flooding packet when the data payload of the second flooding packet and the data payload of the stored copy of the first flooding packet have more than a predetermined maximum number of mismatched bit values.

4. The multi-node system of claim 3, wherein the multi-node system is a mobile ad hoc network (MANET), and the communication node is a mobile communication node.

5. A method of performing passive packet cross-checking of flooding packets within a multi-node system, comprising:

transmitting a first flooding packet from a communication node to a first additional communication node of the multi-node system, whereby the first flooding packet causes the first additional communication node to transmit a second flooding packet based on the first flooding packet to the communication node and to a second additional communication node of the multi-node system;

storing a copy of the first flooding packet in a memory cache of the communication node;

receiving the second flooding packet at the communication node from the first additional communication node;

comparing the second flooding packet and the stored copy of the first flooding packet at the communication; node by comparing a data payload of the second flooding packet to a data payload of the stored copy of the first flooding packet; and determining a status of the first additional communication node based on the comparison of the second flooding packet and the stored copy of the first flooding packet by detecting at least one of: erroneous operation of the first additional communication node when the data payload of the second flooding packet differs from the data payload of the stored copy of the first flooding packet; non-erroneous operation of the first additional communication node when the data payload of the second flooding packet matches the data payload of the stored copy of the first flooding packet; a match between the data payload of the second flooding packet and the stored copy of the first flooding packet when the data payload of the second flooding packet and the data payload of the stored copy of the first flooding packet have no more than a predetermined maximum number of mismatched bit values; or a difference between the second flooding packet and the first flooding packet when the data payload of the second flooding packet and the data payload of the stored copy of the first flooding packet have more than a predetermined maximum number of mismatched bit values.

* * * * *